Feb. 23, 1926.
A. H. GALLAGHER
1,574,618
TREATING APPARATUS
Original Filed May 24, 1924
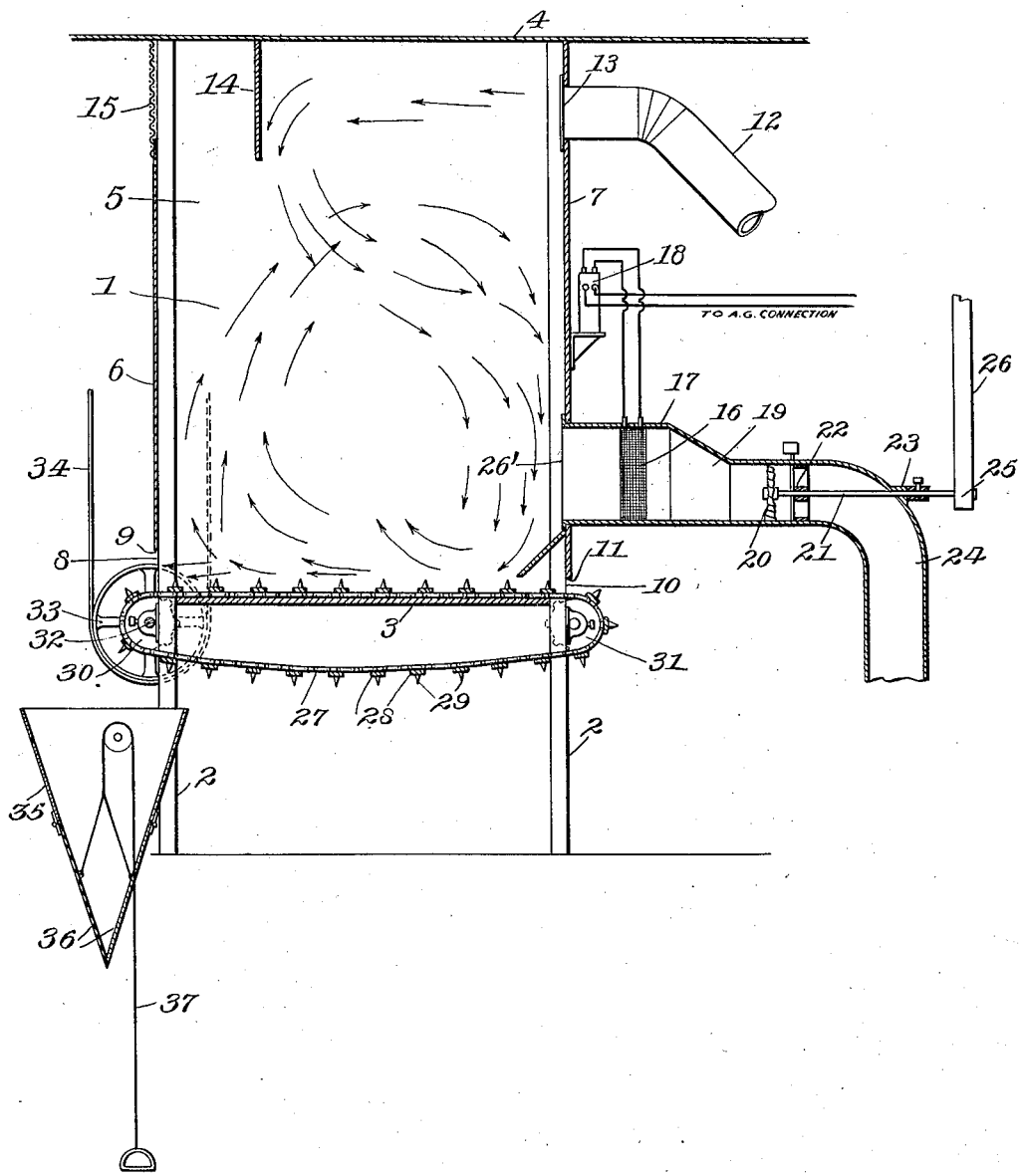
Alfred H. Gallagher, Inventor Patented Feb. 23, 1926.

1,574,618

UNITED STATES PATENT OFFICE.

ALFRED HUGH GALLAGHER, OF CHICAGO, ILLINOIS, ASSIGNOR TO TANNERS PRODUCTS COMPANY, OF CHICAGO, ILLINOIS, A CORPORATION OF DELAWARE.

TREATING APPARATUS.

Original application filed May 24, 1924, Serial No. 715,764. Divided and this application filed May 29, 1925. Serial No. 33,769.

*To all whom it may concern:*

Be it known that I, ALFRED H. GALLAGHER, a citizen of the United States of America, residing at Chicago, in the county of Cook, State of Illinois, have invented certain new and useful Improvements in Treating Apparatus; and I do hereby declare the following to be a full, clear, and exact description of the invention, such as will enable others skilled in the art to which it appertains to make and use the same.

This invention relates to an apparatus for subjecting materials to the action of a treating agent, and particularly to an apparatus for subjecting animal tissue or fiber products, such as hair, feathers and the like, to the action of ozone or ozonized air. The present application is a division of application Serial No. 715,764, filed May 24, 1924.

It is a well known fact that a strong and characteristic odor emanates from animal tissue and fiber, particularly cattle hair, even after the usual cleaning operations, and after careful study and analysis, this strong and characteristic odor of such material has been found to be due to the presence of minute quantities of musk-like or fatty substance on the hair and other substances above referred to, which is not and cannot be removed by the ordinary methods of liming and washing.

This musk-like or fatty substance can be removed by thoroughly washing with soap and hot water, or by the use of a solvent such as benzol or ether, but these methods are not entirely successful either from a practical or economical standpoint, as they tend to destroy qualities in the material necessary to its commercial value. This is especially true where resiliency and loftiness is desired, such as in the manufacture of felts and similar products.

This odor can be destroyed in an economical and practical way by treating the odorous material in the present apparatus in the presence of ozone or ozonized air.

An object of the present invention is to provide means for subjecting the material being treated to the action of the treating agent while said material is in motion, so that intimate contact will occur between the material being treated and the agent.

Another object of this invention is the provision of a treating chamber with means for injecting ozone or ozonized air into the path of travel of the material being treated.

A further object of the present invention is the production of a treating apparatus which is continuous in operation and which discharges the treated material automatically.

A still further object of this invention is the production of an apparatus in which the material being treated is agitated and the portion thereof which passes immediately adjacent the inlet for the treating agent, and which is therefore subjected to intimate contact therewith, will be discharged from the apparatus, while the remaining material will be agitated for further treatment.

Ozone is a colorless gas having strong oxidizing properties and is produced from the oxygen in the air by a high voltage electrical discharge. The best results have been obtained in the production of ozone by a silent brush discharge through an air gap, or through a dielectric, such as glass or mica. Apparently the action of such a discharge is to break up the oxygen in the air into atoms, which reunite in a somewhat unstable triatomic molecule, and this triatomic oxygen or ozone readily gives up its extra atoms of oxygen when brought into contact with oxidizable substances.

When ozone or ozonized air is brought into contact for a short time with cattle hair or the other materials having thereon musk-like, fatty or organic compounds that give rise to the objectionable characteristic odor, said compounds are oxidized and broken up into more simple odorless substances. This change is permanent in character and is as complete as the burning of wood to ashes, and no treatment of the ozonized material will bring back the characteristic odor. Furthermore, the material will not develop the odor again as a result of long standing, unless it is exposed to the presence of similar untreated material, in which case it may absorb some of the odor given up by the raw material.

The physical properties of the material are not changed as a result of being treated with ozone, and a clean completely deodorized material is successfully produced, at a very low cost at an average exposure of about twenty minutes, The single figure of the drawing represents a longitudinal, sectional view through an apparatus made in accordance with the present invention.

Referring to the drawing in detail, 1 indicates the ozonizing chamber which is rectangular in design and consists of vertical corner supports 2, a floor 3, a cover 4, side walls 5, and front and rear walls 6 and 7 respectively. The side walls 5 extend from the cover downwardly to the floor 3, while the front and rear walls 6 and 7 extend downwardly from the cover but terminate above the floor to provide an opening 8 between the latter and the lower edge 9 of the front wall 6, and an opening 10 between the lower edge 11 of the rear wall 7 and the floor 3. These openings are provided for a purpose which will be hereinafter more fully described.

Leading to the chamber 1 from the picker mechanism (not shown in the drawing), is a pneumatic conveyor 12 for feeding the material to be treated. The conveyor is secured in the upper portion of the rear wall 7 and opens into the chamber at 13.

A baffle plate 14 is positioned in the upper portion of the chamber 1 near the front wall 6, directly opposite the opening 13, for the purpose of preventing the accumulation of material upon a screened opening 15 in the front wall 6, and to cause the material to fall downwardly to the lower portion of the chamber. It will be seen that the excess air within the chamber 1 will be permitted to escape through the screened opening 15.

An ozonizer 16 of the silent brush discharge type is contained in a conduit 17 which is substantially rectangular in cross section. High voltage current is supplied to the ozonizer 16 from a transformer 18 to which current may be supplied from the usual electrical installation.

The conduit 17 is reduced in cross section at 19 and made circular, so that the walls thereof will closely encircle a disk-fan 20 secured upon a shaft 21, which is rotatably mounted in a front bearing 22 and a rear bearing 23. The rear bearing 23 is arranged upon the outer wall of an elbow 24 formed in the conduit 17. The shaft 21 extends through the bearing 23 and has mounted on the outer end thereof a pulley wheel 25, over which a belt 26 is adapted to pass for the purpose of transmitting power from any suitable source to the disk-fan 20. The opposite end of the conduit is secured in the wall 7 near the lower edge thereof directly below the conveyor 12, and opens at 26' into the chamber 1.

A horizontally disposed link belt conveyor 27, formed with cross bars 28 having a series of spikes 29 projecting therefrom, passes over a sprocket wheel 30 rotatably secured to the front corner supports 2 adjacent the floor 3 of the chamber 1, and also passes over a similar sprocket wheel 31 rotatably secured to the rear corner supports 2 adjacent the floor 3. Keyed to a shaft 32 on which the sprocket wheel 30 is mounted, is a pulley wheel 33 through which power is transmitted to the conveyor 27 by means of a belt 34, which is, in turn, connected to any suitable source of power. The conveyor is arranged with its upper flight within the chamber 1, and when the conveyor is set in motion it passes through the opening 10, across the floor 3 and out of the chamber 1 through the opening 8. The opening 10 is only large enough to permit the movement of the conveyor therethrough, while the opening 8 is made relatively larger to permit the conveyor to carry with it a portion of the material being treated within the chamber 1.

A scale hopper 35 is arranged below the front portion of the conveyor 27 where said conveyor passes from the chamber 1, and is provided with hinged bottom members 36 which are adapted to be held in closed position by a rope-pull 37.

When the height of the building in which the apparatus is contained is not prohibitive, the roof of said building may be employed as the cover 4.

In operating the present apparatus, the ozonizer 16 is energized and the fan 20 set in operation, whereby air is drawn into the conduit around the elbow 24 to the fan 20 and then blown through the ozonizer 16 and into the chamber 1 through the opening 26'. From this it will be noted that ozonized air is being continually blown into the chamber. The raw material from the picker is conveyed into the chamber 1 by means of the penumatic conveyor 12, which is set in action immediately after the ozonizer is energized and the fan 20 rotated. Due to the force with which the material is fed into the chamber 1, it strikes against the baffle plate 14 and settles backwardly and downwardly past the opening 26' to the conveyor 27. From this it will be seen that the material is treated with the ozonized air as it passes the opening 26'. As soon as the material begins to accumulate upon the conveyor 27, the latter is put into operation whereby the material is caused to travel toward the front wall 6 of the chamber 1, and a small portion thereof is removed from the chamber through the opening 8. When material which is intended to be felted is being treated it passes through the opening and is delivered into the scale hopper 35, and may pass therefrom to a felting apparatus of ordinary construction when the hinged bottom 36 is opened after a sufficient quantity of material has been delivered to the hopper, said material being formed into a resilient odorless felt. It will be noted that the lower portion of the bulk of the material will be moved toward the front wall 6 when the conveyor is operated, and only a portion of this bulk can be passed through the opening 8, the remainder being tumbled first upwardly to the top of the fluffy mass, backwardly toward the rear wall 7, and then downwardly past the opening 26′ to the conveyor. In this way, that part of the bulk which passes nearest the opening 26′ is completely deodorized and as it passes still further downwardly, it is caught by the spikes 29 directly as the conveyor 27 enters the chamber 1, and this portion is carried by the conveyor across the floor 3 and passes from the chamber 1 into the hopper 35. The remainder of the material which did not pass closely to the opening 26′ abuts against the front wall 6 above the opening 8 and is again caused to tumble through the circuit outlined above. This operation is continued until all of the material is completely deodorized. The surplus air which is admitted to the chamber 1 is permitted to pass therefrom through the screened opening 15.

This apparatus has been designed particularly to meet the requirements of the detailed method described in application Serial No. 715,764, but it is to be understood that the apparatus may be advantageously employed in connection with other methods.

Various changes in the details of the construction may be resorted to within the scope and spirit of the appended claims.

What I claim is:

1. In a treating apparatus, the combination of a chamber, means for delivering material to be treated in a current of gas to the upper portion of the chamber, means arranged below the material delivering means for causing the material to circulate in the chamber, and means for delivering a gas in the path of the circulating material.

2. In a treating apparatus, the combination of a chamber, means for delivering material to be treated in a current of gas to the upper portion of the chamber, means arranged below the material delivering means for removing a portion of the material from the chamber and for causing the remaining material to circulate therein, and means for delivering gas in the path of the circulating material.

3. In a treating apparatus, the combination of a chamber in which the material to be treated is adapted to circulate, means for delivering material to the chamber, means for delivering a gas in the path through which the material is adapted to circulate, and a conveyor for causing some of the material to be discharged from the chamber after it has moved past the means for delivering the gas and for causing the remaining material to circulate within the chamber.

4. In an apparatus, the combination of a substantially rectangular chamber having a closed bottom, side, front and rear walls, an opening through which the material to be treated is admitted to the chamber, an opening through which a treating agent is admitted to the chamber, spaces between the lower edges of the front and rear walls and the bottom of the chamber, a conveyor adjacent to and adapted to traverse the bottom of the chamber and pass through said spaces for removing a portion of the treated material and for causing the remaining material to be further agitated within the chamber.

5. In a treating apparatus, the combination of a chamber, a conveyor arranged at the lower end of the chamber and adapted to traverse the same, said conveyor being spaced from the lower edge of one side wall of the chamber, whereby some of the material in the chamber will be carried with the conveyor and discharged between said conveyor and the lower edge of said side wall, while the remaining material which is moved by the conveyor will abut against the side wall and be agitated for further treatment.

6. In a treating apparatus, the combination of a chamber, a conveyor arranged at the lower end of the chamber in spaced relation to the lower edge of one side wall thereof, said conveyor being adapted to traverse the chamber in the direction of said side wall and being provided with projecting pins for engaging a portion of the material in the chamber, whereby some of the material in the chamber will be carried with the conveyor and discharged from the chamber below said lower edge of the side wall, while the remaining material which is moved by the conveyor will abut against the side wall and be agitated for further treatment.

7. In a treating apparatus, the combination of a chamber, a pneumatic conveyor for feeding the material to be treated into the upper portion of the chamber, means below the level of the pneumatic conveyor for admitting a treating agent, a filter for permitting the escape of air but preventing the passage therethrough of the material being treated, a baffle plate arranged in front of the filter to prevent the material being blown directly upon the same, and for deflecting the travel of the material being treated, so that it will pass adjacent the treating agent admitting means, and a conveyor for removing the material which passes immediately adjacent the treating agent admitting means.

8. In an ozonizing apparatus, the combination of a chamber, a pneumatic conveyor for feeding the material to be treated into the upper portion of the chamber, an ozonizer in communication with the chamber at a point below the level of the pneumatic conveyor for admitting ozonized air, a filter for permitting the escape of air but preventing the passage therethrough of the material being treated, a baffle plate arranged in front of the filter to prevent the material being blown directly upon the same, and for deflecting the travel of the material so that it will pass adjacent the ozonizer in communication with the chamber, and a conveyor for removing the ozonized material after it has passed immediately adjacent said communication.

9. In an ozonizing apparatus, the combination of a chamber, a pneumatic conveyor for feeding the material to be treated into the upper portion of the chamber, an ozonizer in communication with the chamber at a point below the level of the pneumatic conveyor, air propelling means for forcing air through the ozonizer and the resulting ozonized air into the chamber, a filter for permitting the escape of air but preventing the passage therethrough of the material being treated, a baffle plate arranged in front of the filter to prevent the material being blown directly upon the same and for deflecting the travel of the material so that it will pass adjacent the ozonizer in communication with the chamber, and a conveyor for removing the ozonized material after it has passed immediately adjacent said communication.

10. In a treating apparatus, the combination of a chamber, a pneumatic conveyor for feeding the material to be treated into the upper portion of the chamber, means below the level of the pneumatic conveyor for admitting a treating agent, a filter for permitting the escape of the air but preventing the passage therethrough of the material being treated, a baffle plate arranged in front of the filter to prevent the material being blown directly upon the same, and for deflecting the travel of the material being treated, so that it will pass adjacent the treating agent admitting means, and a conveyor arranged at the lower end of the chamber in spaced relation to the lower edge of one side wall thereof, said conveyor being adapted to traverse the chamber in the direction of said side wall and being provided with projecting pins for engaging a portion of the material, whereby some of the material in the chamber will be carried with the conveyor and discharged from the chamber below said lower edge of the side wall, while the remaining material which is moved by the conveyor will abut against the side wall and be agitated for further treatment.

11. In a treating apparatus, the combination of a chamber, a pneumatic conveyor for feeding the material to be treated into the upper portion of the chamber, means below the level of the pneumatic conveyor for admitting a treating agent, a conveyor arranged above the floor of the chamber and adapted to traverse the same, a plurality of walls of the chamber terminating in spaced relation to the floor to provide space through which the conveyor passes, the wall below which the conveyor passes from the chamber being spaced a distance from the floor which permits a portion of the material to move with the conveyor and pass from the chamber therewith, while the remaining material is agitated within the chamber.

In testimony whereof I affix my signature.

ALFRED HUGH GALLAGHER.